(12) United States Patent
Ikeda

(10) Patent No.: US 12,142,060 B1
(45) Date of Patent: Nov. 12, 2024

(54) OBJECT RECOGNITION METHOD AND OBJECT RECOGNITION DEVICE

(71) Applicants: Nissan Motor Co., Ltd., Yokohama (JP); Renault S.A.S., Boulogne-Billancourt (FR)

(72) Inventor: Akinobu Ikeda, Kanagawa (JP)

(73) Assignees: Nissan Motor Co., Ltd., Yokohama (JP); Renault S.A.S., Boulogne-Billancourt (FR)

( * ) Notice: Subject to any disclaimer, the term of this patent is extended or adjusted under 35 U.S.C. 154(b) by 0 days.

(21) Appl. No.: 18/699,806

(22) PCT Filed: Oct. 12, 2021

(86) PCT No.: PCT/IB2021/000705
§ 371 (c)(1),
(2) Date: Apr. 9, 2024

(87) PCT Pub. No.: WO2023/062400
PCT Pub. Date: Apr. 20, 2023

(51) Int. Cl.
*G06V 20/58* (2022.01)
*G06V 10/762* (2022.01)
*G06V 10/77* (2022.01)
*G06V 10/80* (2022.01)

(52) U.S. Cl.
CPC ............ *G06V 20/58* (2022.01); *G06V 10/762* (2022.01); *G06V 10/7715* (2022.01); *G06V 10/806* (2022.01)

(58) Field of Classification Search
USPC ................................................. 382/103, 104
See application file for complete search history.

(56) References Cited

U.S. PATENT DOCUMENTS

| | | | | |
|---|---|---|---|---|
| 6,731,777 | B1* | 5/2004 | Nishigaki | G06V 20/64 |
| | | | | 382/104 |
| 9,870,512 | B2* | 1/2018 | Rogan | G06T 15/08 |
| 10,317,522 | B2* | 6/2019 | Tong | G01S 13/878 |
| 10,634,793 | B1* | 4/2020 | Siao | G06V 10/80 |
| 10,726,309 | B2* | 7/2020 | Lee | G06T 7/248 |
| 10,852,419 | B2* | 12/2020 | Zhong | B60R 11/04 |

(Continued)

FOREIGN PATENT DOCUMENTS

| | | |
|---|---|---|
| JP | 2017-129446 A | 7/2017 |
| JP | 2019-18743 A | 2/2019 |

(Continued)

*Primary Examiner* — Ishrat I Sherali
(74) *Attorney, Agent, or Firm* — Young Basile Hanlon & MacFarlane, P.C.

(57) ABSTRACT

An object recognition method includes generating a cluster at a fixed period by clustering distance measurement points acquired from an object detection sensor, mapping the cluster to an image captured by an imaging means, setting a region on the image to which the cluster is mapped as a processing region, extracting a feature point from the image in the set processing region, calculating a movement speed of the extracted feature point, and determining whether clusters at different time points are clusters of an identical object based on a difference between positions of two feature points corresponding to the clusters at the different time points and a difference between movement speeds of the two feature points corresponding to the clusters at the different time points.

10 Claims, 11 Drawing Sheets

(56) References Cited

U.S. PATENT DOCUMENTS

| | | | |
|---|---|---|---|
| 11,885,872 B2* | 1/2024 | Zhong | G06V 10/806 |
| 2017/0254895 A1 | 9/2017 | Tong et al. | |
| 2019/0120955 A1 | 4/2019 | Zhong et al. | |
| 2022/0230446 A1* | 7/2022 | Miyamoto | B60R 99/00 |
| 2022/0373683 A1 | 11/2022 | Moriizumi | |

FOREIGN PATENT DOCUMENTS

| | | |
|---|---|---|
| JP | 2019-21060 A | 2/2019 |
| WO | 2020/104423 A1 | 5/2020 |
| WO | 2021/111747 A1 | 6/2021 |
| WO | 2021/171498 A1 | 9/2021 |

\* cited by examiner

FIG. 3
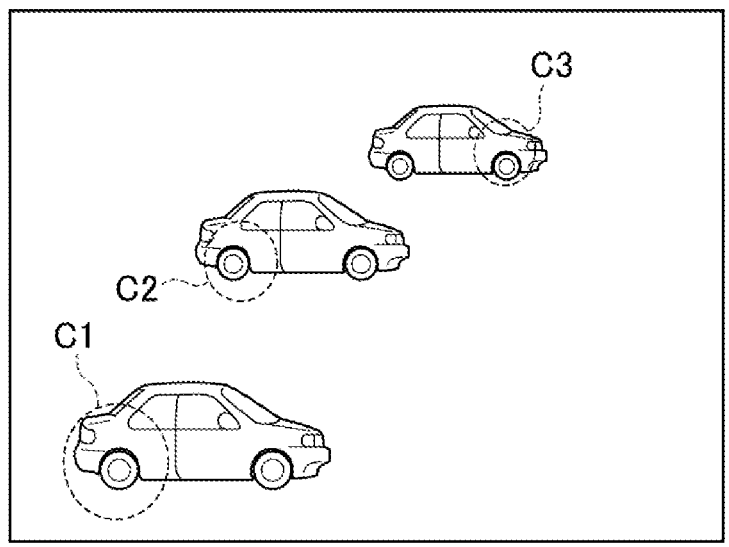
t=k
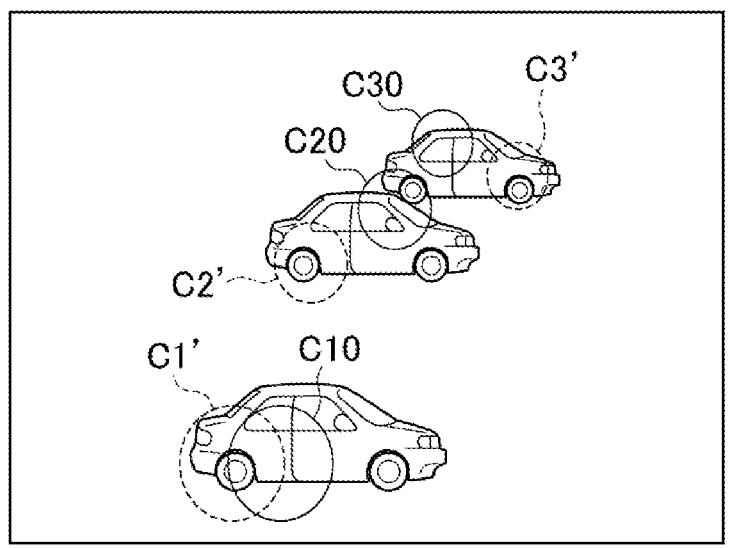
t=k+1

FIG. 5

CLUSTER IN PREVIOUS FRAME

| CURRENT CLUSTER | C1' | C2' | C3' | New |
|---|---|---|---|---|
| C10 | 10 | 100 | 200 | |
| C20 | 200 | 10 | 200 | |
| C30 | 200 | 200 | 100 | |

SUFFICIENT THRESHOLD 20
NECESSARY THRESHOLD 50

FIG. 6

CLUSTER IN PREVIOUS FRAME

| CURRENT CLUSTER | C1' | New |
|---|---|---|
| C10 | 10 | |
| C20 | 25 | |
| C30 | 30 | |

SUFFICIENT THRESHOLD 20
NECESSARY THRESHOLD 50

FIG. 7
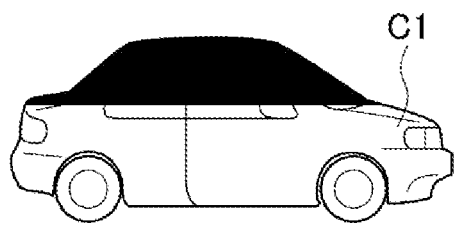
t=k
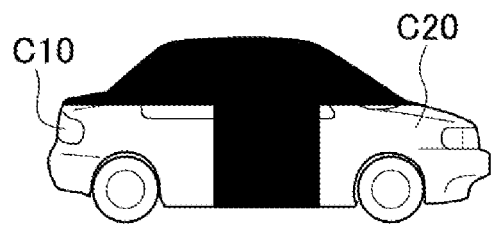
t=k+1
FIG. 8
CLUSTER IN PREVIOUS FRAME
| | | C1' | New |
|---|---|---|---|
| CURRENT CLUSTER | C10 | 10 | |
| | C20 | 15 | |
| | C30 | 30 | |
SUFFICIENT THRESHOLD 20
NECESSARY THRESHOLD 50

FIG. 9

|      | C1' | C2' | C3' | New |
|------|-----|-----|-----|-----|
| C10  | 10  | 15  | 100 |     |
| C20  | 15  | 100 | 100 |     |
| C30  | 30  | 60  | 100 |     |
| C40  | 100 | 30  | 40  |     |
| C50  | 100 | 40  | 45  |     |

SUFFICIENT THRESHOLD 20
NECESSARY THRESHOLD 50

|      | C2' | C3' | New |
|------|-----|-----|-----|
| C30  | 60  | 100 |     |
| C40  | 30  | 40  |     |
| C50  | 40  | 45  |     |

FIG. 10
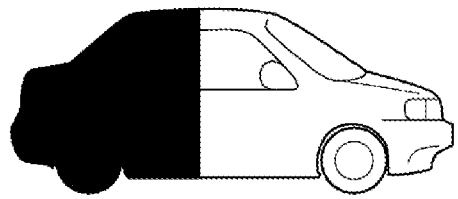
t=0
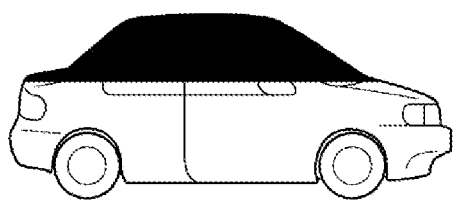
t=1
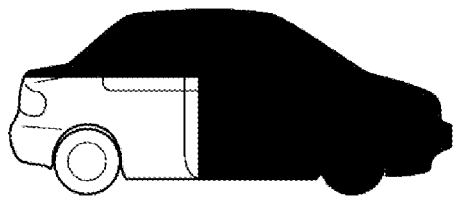
t=2

OBJECT RECOGNITION METHOD AND OBJECT RECOGNITION DEVICE

TECHNICAL FIELD

The present invention relates to an object recognition method of recognizing an object existing around a vehicle and an object recognition device therefor.

BACKGROUND ART

Patent Literature 1 disclose a conventional object detection device for detecting an object around a vehicle. In the object detection device disclosed in Patent Literature 1, measurement points acquired by LIDAR are clustered into one or more clusters, and the clusters are fitted to a shape model.

CITATION LIST

Patent Literature

Patent Literature 1: Japanese Patent Publication No. 2017-129446

SUMMARY OF INVENTION

Problems to be Solved by Invention

Here, in the conventional object detection device described above, when a cluster is fitted to a shape model, whether to fit a cluster to a shape model is judged using a movement speed of the cluster. However, it has been difficult to accurately measure the movement speed of the cluster since the points to be clustered may be different at different time points, even at measurement points on the same object.

For example, when the rear of a vehicle is shadowed by a building, measurement points in the front of the vehicle are clustered, and when the front of the vehicle is hidden by a building, measurement points in the rear of the vehicle are clustered. Therefore, it was not possible to accurately measure the movement speed of a cluster since different parts of the same vehicle are clustered at different time points.

Thus, since the movement speed of the cluster cannot be accurately measured by the conventional object detection device, it is a problem that an object around a vehicle cannot be accurately recognized as the identical object at different time points.

Therefore, the present invention has been made in view of the actual conditions mentioned above, and aims to provide an object recognition method capable of accurately recognizing an object around a vehicle as the identical object at different time points, and an object recognition device therefor.

Solution to Solve Problems

In order to solve the problem above, an object recognition method and an object recognition device therefor according to an embodiment of the present invention generates a cluster at a fixed period by clustering distance measurement points acquired from an object detection sensor. The cluster is mapped to an image captured by an imaging means, a region on the image to which the cluster is mapped is set as a processing region, a feature point is extracted from the image in the set processing region, and a movement speed of the extracted feature point is calculated. Thereafter, whether clusters at different time points are clusters of an identical object is determined based on a difference between positions of two feature points corresponding to the clusters at the different time points and a difference between movement speeds of the two feature points corresponding to the clusters at the different time points.

Effects of Invention

According to the present invention, it is possible to accurately recognize an object around a vehicle as the identical object at different time points.

BRIEF DESCRIPTION OF DRAWINGS

FIG. 3 is a diagram for explaining a method of determining the identical object by an object recognition device according to the first embodiment.

FIG. 5 shows an example of an evaluation matrix generated by the object recognition device according to the first embodiment.

FIG. 6 shows an example of an evaluation matrix generated by the object recognition device according to the first embodiment.

FIG. 7 is a diagram for explaining clustering by the object recognition device according to the first embodiment.

FIG. 8 is a diagram showing an example of an evaluation matrix generated by the object recognition device according to the first embodiment.

FIG. 9 is a diagram showing an example of an evaluation matrix generated by the object recognition device according to the first embodiment.

FIG. 10 is a diagram for explaining clustering by the conventional object detection device.

DESCRIPTION OF EMBODIMENTS

First Embodiment

Figure 1:
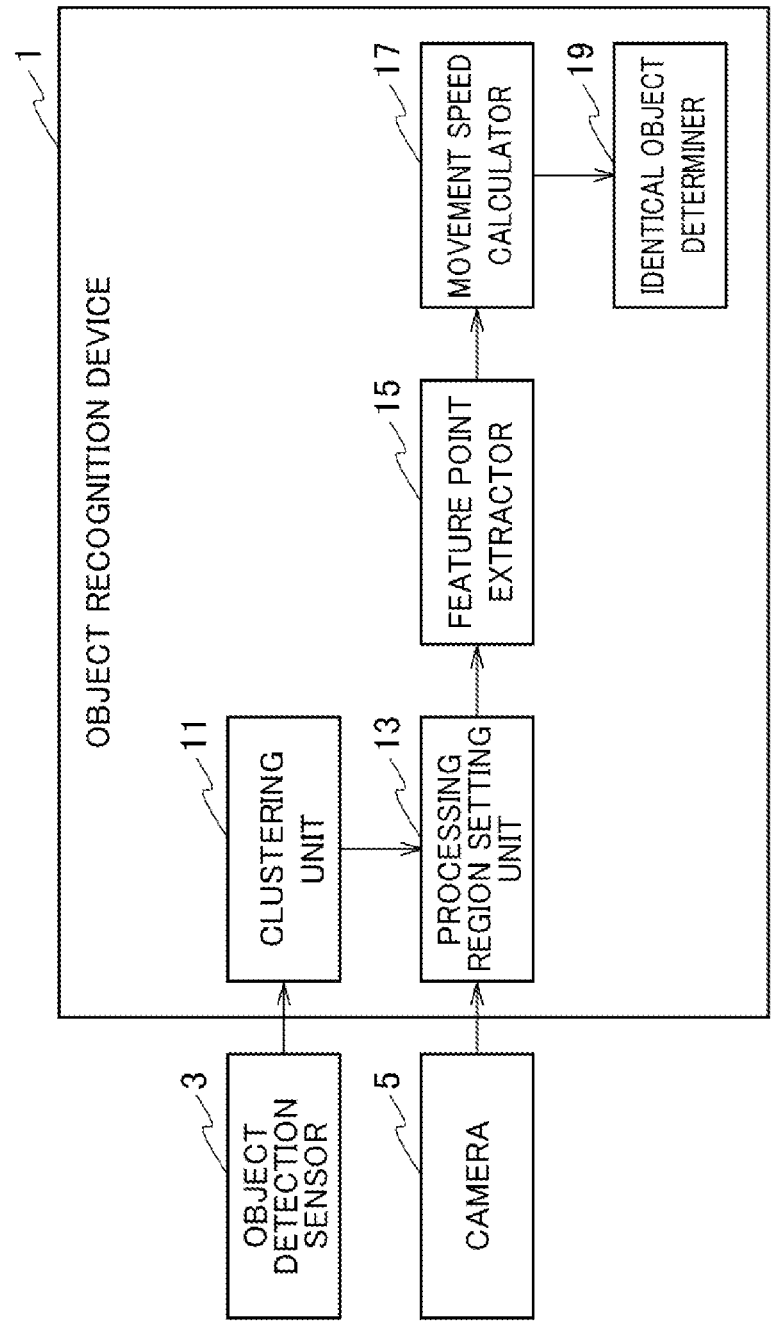
FIG. 1 is a block diagram showing a configuration of a vehicle including an object recognition device according to the first embodiment.

Hereinafter, a first embodiment to which the present invention is applied will be described with reference to the drawings. In the description of the drawings, the same parts are denoted by the same reference numerals, and a detailed description thereof will be omitted.

(Configuration of a Vehicle Including Object Recognition Device)

FIG. 1 is a block diagram showing a configuration of a vehicle with an object recognition device according to the present embodiment. As shown in FIG. 1, a vehicle 100 includes an object recognition device 1, an object detection sensor 3, and a camera 5. When the vehicle 100 starts a travel, the object recognition device 1 detects an object existing around the vehicle 100 using distance measurement points detected by the object detection sensor 3 and an image captured by the camera 5. Then, the object recognition device 1 determines whether the detected object is the identical object at different time points, and tracks the detected object.

The object detection sensor 3 detects an object existing around the vehicle 100 and detects distance measurement points at which a distance to each point on the detected object is measured. The detected distance measurement points are output to the object recognition device 1 and recorded in a storage device such as a memory (not shown). The object detection sensor 3 may be a sensor capable of detecting a distance to an object existing around the vehicle 100. For example, a Light Detection and Ranging (LiDAR), a laser radar, a stereo camera, or a Time of Flight (ToF) camera may be used.

The camera 5 is an imaging means having an imaging element such as a Charge-Coupled Device (CCD) or Complementary Metal Oxide Semiconductor (CMOS). The camera 5 is mounted on the vehicle 100 and photographs the surroundings of the vehicle 100. The captured image is output to the object recognition device 1 and recorded in a storage device such as a memory (not shown).

The object recognition device 1 is mounted on the vehicle 100 and recognizes an object existing around the vehicle 100. In particular, the object recognition device 1 clusters distance measurement points acquired from the object detection sensor 3 to generate a cluster at a fixed period, and sets a processing region by mapping the cluster to an image captured by the camera 5. Then, a feature point is extracted from the image in the processing region, the movement speed of the feature point is calculated, and whether the clusters at different time points are clusters of the identical object is determined based on a difference between the positions of the two feature points corresponding to the clusters at different time points and a difference between the movement speeds. The object recognition device 1 includes a clustering unit 11, a processing region setting unit 13, a feature point extractor 15, a movement speed calculator 17, and an identical object determiner 19.

The clustering unit 11 acquires the distance measurement points detected by the object detection sensor 3, and generates a cluster at a fixed period by performing a clustering process on the acquired distance measurement points. In the clustering process, a plurality of distance measurement points existing within a prescribed distance from each other are grouped (clustered) among the acquired distance measurement points to generate a cluster.

The processing region setting unit 13 acquires an image around the vehicle 100 captured by the camera 5, maps the cluster generated by the clustering unit 11 to the acquired image, and sets the region on the image mapped by the cluster as the processing region.

Figure 2:
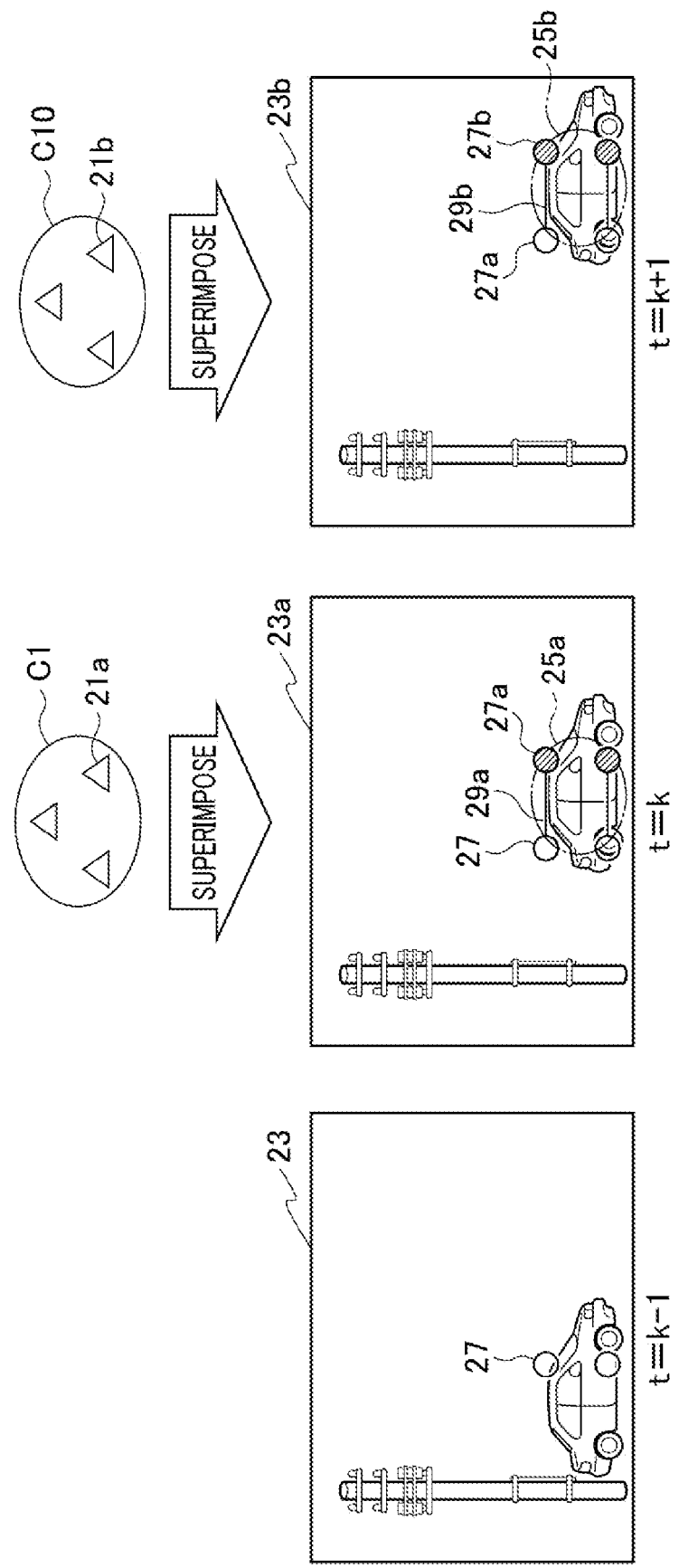
FIG. 2 is a diagram for explaining a method of determining the identical object by an object recognition device according to the first embodiment.

For example, as shown in FIG. 2, the cluster C1 is generated by clustering a plurality of distance measurement points 21*a* detected by the object detection sensor 3 at the time t=k. The generated cluster C1 is then superimposed on an image 23*a* captured by the camera 5, and a region on the image 23*a* on which the cluster C1 is superimposed is set as a processing region 25*a*. Similarly, at time t=k+1, the cluster C10 generated by the distance measurement points 21*b* is superimposed on an image 23*b* to set a processing region 25*b*.

The feature point extractor 15 extracts a feature point from an image in the processing region set by the processing region setting unit 13. For example, the feature point extractor 15 extracts the feature points 27*a* and 27*b* having high feature amounts from the processing regions 25*a* and 25*b* of the images 23*a* and 23*b* in FIG. 2.

Feature points are points having features in relation to the surrounding pixels, such as edge points having a greater luminance difference or hue difference from the surrounding pixels than other portions on the image, or points having features in relation to the change of luminance or hue with respect to the surrounding pixels. That is, the feature points are pixels or sets of pixels having unique features that can be discriminated from other pixels. The method of extracting the feature points on the image is a generally known technique, and the known technique can be applied as appropriate without limiting to the above.

A movement speed calculator 17 calculates a movement speed of a feature point extracted by the feature point extractor 15. Specifically, the movement speed calculator 17 matches an extracted feature point with a feature point on the image in a previous frame by template matching and the like, and calculates an optical flow from the coordinates of the matched feature points. The optical flow represents a movement of an object in an image by a vector. Then, the movement speed calculator 17 averages velocity vectors of the optical flows in a processing region to calculate the movement speed of the feature point. The method of calculating the optical flow has been generally known, and will not be described in detail here.

For example, as shown in FIG. 2, the feature point 27*b* extracted from the image 23*b* at the time t=k+1 is matched with the feature point 27*a* extracted from the image 23*a* at the time t=k, and the optical flow 29*b* is calculated from the coordinates of the matched feature points. The velocity vectors of the plurality of optical flows 29*b* in the processing region 25*b* are averaged to calculate the velocity vector (vx, vy). This velocity vector is the movement speed of the feature point corresponding to the cluster C10 at the time t=k+1.

The identical object determiner 19 determines whether the clusters at different time points are clusters of the identical object based on the difference between positions of two feature points corresponding to the clusters at different time points and the difference between the movement speeds of the two feature points corresponding to the clusters at different time points.

For example, as shown in FIG. 3, a case will be described in which it is determined whether the clusters C1, C2, and C3 detected at the time t=k and the clusters C10, C20, and C30 detected at the time t=k+1 are an identical object. The identical object determiner 19 moves the feature points in the clusters C1, C2, and C3 by a time difference between the time t=k and the time t=k+1 according to the movement speed calculated by the movement speed calculator 17, and determines the clusters C1', C2', and C3'.

The identical object determiner 19 sets combinations between the clusters C1', C2', and C3' and the clusters C10, C20, and C30, calculates an agreement degree for each combination, and determines whether the clusters are of the identical object based on the agreement degree.

The agreement degree F. indicates the degree of agreement of the clusters at different time points, and can be calculated by the following Formula (1):

$$f = a \times (\text{difference in the positions of the feature points corresponding to the clusters})^2 + b \times (\text{difference in the movement speeds of the feature points corresponding to the clusters})^2 \quad (1)$$

where a and b are coefficients.

In this formula of the agreement degree F., a first evaluation point is calculated based on the difference between the positions of the two feature points corresponding to the clusters at different time points, and a second evaluation point is calculated based on the difference between the movement speeds of the two feature points corresponding to the clusters at different time points. The agreement degree is calculated based on the first evaluation point and the second evaluation point. As shown in Formula (1), since the agreement degree is calculated by using the difference between the positions of the feature points and the difference between the movement speeds, the degree of agreement between two clusters at different time points increases as the agreement degree decreases.

Specifically, the first evaluation point is a square of a difference between positions of two feature points corresponding to clusters at the different time points, and the second evaluation point is a square of a difference between movement speeds of two feature points corresponding to clusters at the different time points. Then, a first coefficient a to be multiplied by the first evaluation point and a second coefficient b to be multiplied by the second evaluation point are set, and the agreement degree F. is calculated by adding a value obtained by multiplying the first evaluation point by the first coefficient a and a value obtained by multiplying the second evaluation point by the second coefficient b. It is noted that the units of the first evaluation point and the second evaluation point are different since they are the position and the speed, respectively. Therefore, the first coefficient a, and the second coefficient b are set to normalize the difference of units.

For example, in FIG. 3, in the case of the combination of the clusters C1' and C10, the difference between the position of the feature point corresponding to the cluster C1' and the position of the feature point corresponding to the cluster C10 is first determined. Similarly, the difference between the movement speed of the feature point corresponding to the cluster C1' and the movement speed of the feature point corresponding to the cluster C10 is determined. The agreement degree F. can be calculated by squaring these differences, multiplying by the coefficients a, and b, respectively, and then adding together. As a result, if the agreement degree F. is sufficiently small, it can be determined that the clusters C1 and C10 at different times are clusters of the identical object. However, a detailed determination method will be described later.

The object recognition device 1 is a controller composed of a general-purpose electronic circuit including a microcomputer, a microprocessor, and a CPU, and peripheral equipment such as a memory, and installed a computer program for executing the object recognition process. Each function of the object recognition device 1 can be implemented by one or more processing circuits. The processing circuits include programmed processing devices, including, for example, electrical circuits, and devices such as application-specific integrated circuits (ASIC) and conventional circuit components prepared to perform the functions described in the embodiments.

(Object Recognition Process)

Next, an object recognition process executed by the object recognition device 1 according to the present embodiment will be described. FIG. 4 is a flowchart showing a processing procedure of the object recognition process by the object recognition device 1 according to the present embodiment. The object recognition process is started when the vehicle 100 is started.

As shown in FIG. 4, in step S10 at time t=k−1, the camera 5 captures images of the vehicle's surroundings and outputs an image at the time t=k−1. The captured images are output to a storage device such as a memory of the object recognition device 1.

In step S11, the feature point extractor 15 extracts a feature point from the images captured in step S10. For example, as shown in FIG. 2, a feature point 27 is extracted from an image 23.

Shifting to the time t=k, in step S20, the clustering unit 11 acquires distance measurement points detected by the object detection sensor 3 and performs the clustering process on the obtained distance measurement points to generate a cluster. For example, as shown in FIG. 2, at the time t=k, the cluster C1 is generated by the distance measurement points 21a.

In step S21, the camera 5 captures images of the vehicle's surroundings of and outputs an image at the time t=k.

In step S22, the processing region setting unit 13 acquires the image at the time t=k captured by the camera 5, maps the cluster generated in step S20 on the acquired image, and sets the region on the image mapped by the cluster as a processing region. For example, as shown in FIG. 2, at the time t=k, the processing region 25a is set to the image 23a.

In step S23, the feature point extractor 15 extracts a feature point from an image in the processing region set in step S22. For example, as shown in FIG. 2, the feature point 27a is extracted from the processing region 25a of the image 23a.

In step S24, the movement speed calculator 17 matches the extracted feature point with the feature point on the image 1 in a previous frame by template matching and the like. For example, as shown in FIG. 2, the feature point 27a extracted from the image 23a at the time t=k is matched with the feature point 27 extracted from the image 23 at time the t=k−1.

In step S25, the movement speed calculator 17 calculates an optical flow from the coordinates of the feature points matched in step S24. For example, as shown in FIG. 2, optical flow 29a is calculated from the coordinates of the matched feature points 27 and 27a.

In step S26, the movement speed calculator 17 averages the velocity vectors of the plurality of optical flows 29a in the processing region 25a to calculate a velocity vector (vx, vy). This velocity vector is the movement speed of the feature point corresponding to the cluster C1 at the time t=k.

Figure 4A:
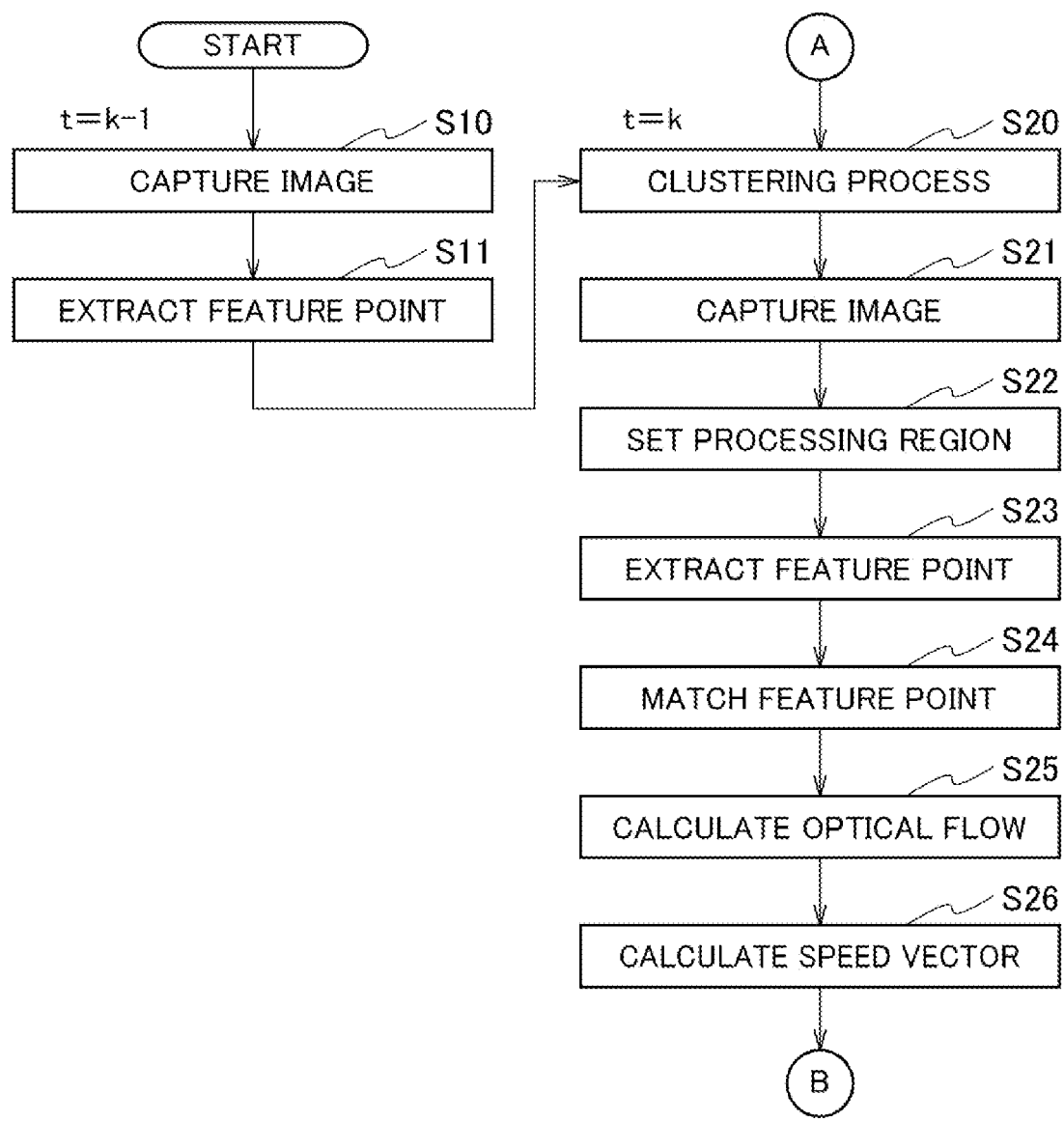
FIG. 4A is a flowchart showing a processing procedure for an object recognition process by an object recognition device according to the first embodiment.
Figure 4B:
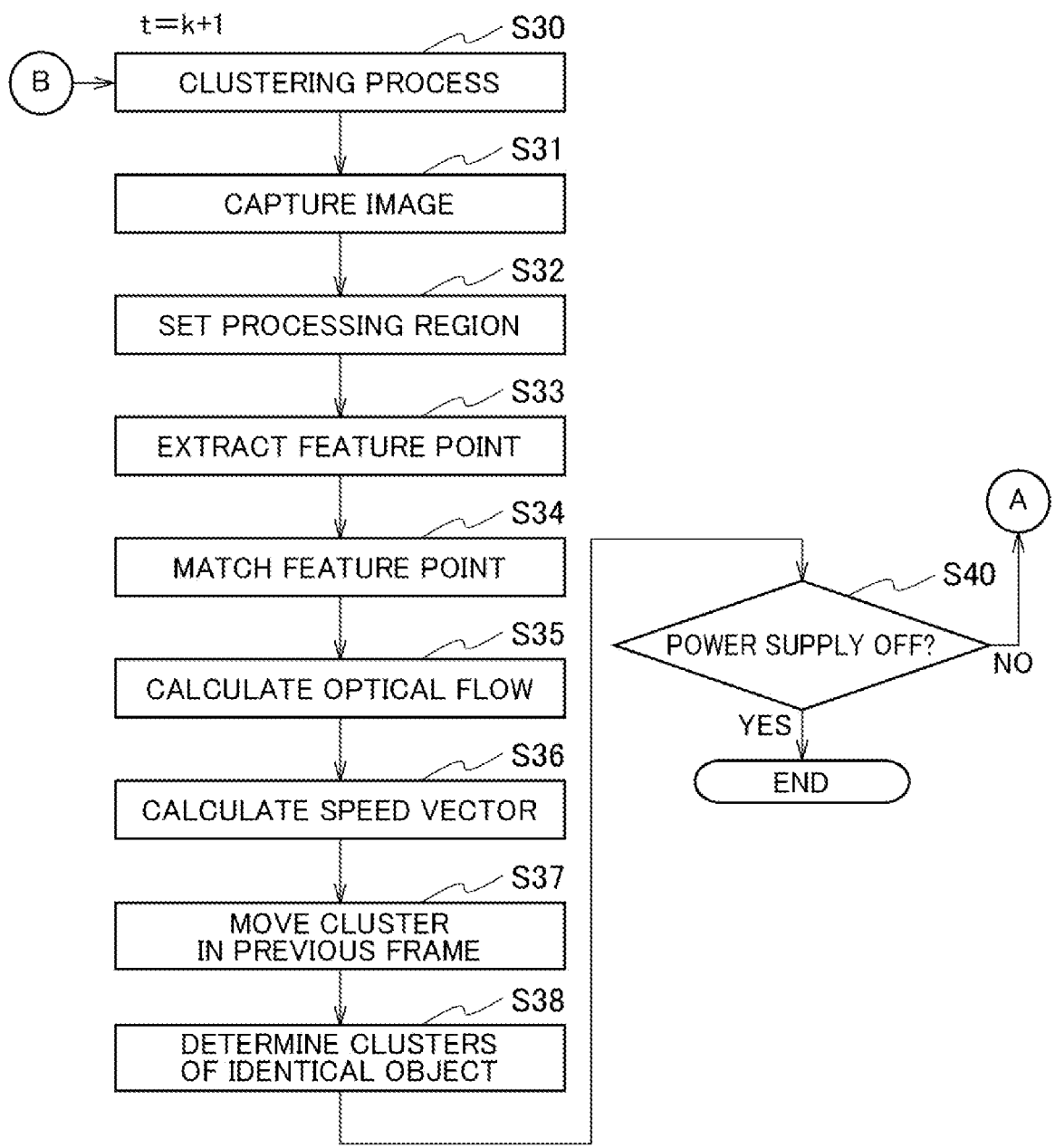
FIG. 4B is a flowchart showing a processing procedure for an object recognition process by an object recognition device according to the first embodiment.

Next, shifting to the time t=k+1 shown in FIG. 4B, in step S30, the clustering unit 11 acquires distance measurement points detected by the object detection sensor 3 and performs the clustering process on the obtained distance measurement points to generate a cluster. For example, as shown in FIG. 2, at the time t=k+1, the cluster C10 is generated by the distance measurement points 21b.

In step S31, the camera 5 captures images of the vehicle's surroundings and outputs an image at the time t=k+1.

In step S32, the processing region setting unit 13 acquires the image at the time t=k+1 captured by the camera 5, maps the cluster generated in step S30 on the acquired image, and sets the region on the image mapped by the cluster as a processing region. For example, as shown in FIG. 2, the processing region 25b is set to the image 23b at the time t=k+1.

In step S33, the feature point extractor 15 extracts a feature point from an image in the processing region set in step S32. For example, as shown in FIG. 2, the feature point 27b is extracted from the processing region 25b of the image 23b.

In step S34, the movement speed calculator 17 matches the extracted feature point with a feature point on the image in a previous frame by template matching and the like. For example, as shown in FIG. 2, the feature point 27b extracted from the image 23b at the time t=k+1 is matched with the feature point 27a extracted from the image 23a at the time t=k.

In step S35, the movement speed calculator 17 calculates optical flow from the coordinates of the feature points matched in step S34. For example, as shown in FIG. 2, optical flow 29b is calculated from the coordinates of the matched feature points 27a and 27b.

In step S36, the movement speed calculator 17 averages the velocity vectors of the plurality of optical flows 29b in the processing region 25b to calculate a velocity vector (vx, vy). This velocity vector is the movement speed of the feature point corresponding to the cluster C10 at the time t=k+1.

In step S37, the identical object determiner 19 moves the cluster 1 in a previous frame according to the movement speed calculated in step S26 to determine the cluster after the movement. For example, as shown in FIG. 3, the feature points in the clusters C1, C2, and C3 at the time t=k are moved according to the movement speed by a time difference between t=k and t=k+1 to determine the clusters C1', C2', and C3' after the movement.

In step S38, the identical object determiner 19 determines whether the clusters at different time points are clusters of the identical object. First, the identical object determiner 19 sets combinations among the clusters at different time points, and calculates the agreement degree for each set combination. Specifically, the combinations between the clusters moved in step S37 and the clusters of the current frame are set, and the agreement degree is calculated for each combination. For example, as shown in FIG. 3, the combinations between the clusters C1', C2', and C3' after the movement and the clusters C10, C20, and C30 of the current frame are set, and the agreement degree is calculated for each combination.

The agreement degree F. can be calculated by the above Formula (1). Specifically describing Formula (1), the agreement degree between a cluster Ci and a cluster Cj can be expressed by the following Formula (2):

$$f(Ci, Cj) = a(xi-xj)^2 + a(yi-yj)^2 + b(vxi-vxj)^2 + b(vyi-vyj)^2 \quad (2).$$

For example, in the combination of clusters C1' and C10, the difference between the position of the feature point corresponding to cluster C1' and the position of the feature point corresponding to cluster C10 is determined, and the difference between the movement speed of the feature point corresponding to cluster C1' and the movement speed of the feature point corresponding to cluster C10 is determined. The agreement degree F. can be calculated by multiplying a square of these differences by the coefficients a, and b, respectively, and then adding together.

When the agreement degree is calculated in this way, the identical object determiner 19 then generates an evaluation matrix using the agreement degree calculated for each set combination. For example, as shown in FIG. 5, combinations between the clusters C1', C2', and C3' after movement and the clusters C10, C20, and C30 of the current frame are set, and the evaluation matrix is generated using the agreement degree calculated for each combination. The numerical value constituting the evaluation matrix shown in FIG. 5 is the agreement degree. The smaller the numerical value, the higher the probability that the combined clusters are clusters of the identical object.

Here, the identical object determiner 19 sets the agreement degree in which the combined two clusters at different time points may be sufficiently considered to be clusters of the identical object as a sufficient threshold. Therefore, a combination having an agreement degree less than this sufficient threshold and satisfying the sufficient threshold can be determined to be the cluster of the identical object.

Further, the identical object determiner 19 sets the agreement degree required at least for the combined two clusters of the different time points to be clusters of the identical object as a necessary threshold. Therefore, a combination having the agreement degree equal to or greater than this necessary threshold and not satisfying the necessary threshold can be determined not to be the cluster of the identical object.

For example, in the case of FIG. 5, the sufficient threshold is set to 20 and the necessary threshold is set to 50. Therefore, as indicated by a circle, the combination of C1' and C10 and the combination of C2' and C20 are less than the sufficient threshold, and these combinations are extracted and determined to be clusters of the identical object. As a result, the clusters C10 and C20 of the current frame are determined to be the identical objects to the clusters C1 and C2 in a previous frame, and the identification numbers (IDs) of the clusters C1 and C2 in a previous frame are inherited, respectively. Therefore, the object recognition device 1 can track the clusters C1 and C2 in the previous to the clusters C10 and C20 of the current frame.

On the other hand, the cluster C30 of the current frame cannot inherit the ID from the cluster 1 in the previous frame since no combination satisfies the required threshold. Therefore, a new ID is assigned to the cluster C30.

It is also possible that the number of clusters in the current frame does not correspond to the number of clusters in the previous frame. For example, as shown in FIG. 6, there may be one cluster in the previous frame and three clusters in the current frame. In this case, since only cluster C10 is less than the sufficient threshold, the ID of cluster C1 in the previous frame is inherited, and new IDs are assigned to clusters C20 and C30.

Furthermore, in the clustering process, a cluster of the identical object may be divided into multiple clusters. For example, as shown in FIG. 7, at the time t=k, one cluster C1 is generated for the vehicle, but at the time t=k+1, two clusters C10 and C20 are generated for the vehicle since the vehicle is shadowed by a building.

In such a case, as shown in FIG. 8, the combination of C1' and C10, and the combination of C1' and C20 are less than the sufficient threshold. Therefore, in this case, the cluster of C10 and the cluster of C20 are united into one cluster to inherit the ID of C1.

It is also possible that the number of clusters in the current frame is large. For example, as shown in FIG. 9, there are three clusters in the previous frame and five clusters in the current frame. In this case, since the combination of C1' and C10 and the combination of C1' and C20 are less the sufficient threshold, the ID is determined. Therefore, the combination including C1', C10, and C20 is deleted.

Next, among the remaining combinations, the combination including C30 is equal to or greater than the necessary threshold, and a new ID is assigned. Since the remaining combinations are less than the necessary threshold, the combination in which the sum of the degrees of agreement is minimized is selected. Specifically, 75 is obtained by adding the agreement degree from the combination of C2' and C40, which is 30 and the agreement degree of the combination of C3' and C50, which is 45. On the other hand, 80 is obtained by adding the agreement degree of the combination of C3' and C40, which is 40 and the agreement degree of the combination of C2' and C50, which is 40. Therefore, as shown in the circle, the sum of the combination of C2' and C40 and the combination of C3' and C50 is smaller, so the combinations are extracted. As a result, cluster C40 inherits the ID of cluster C2 in a previous frame, and cluster C50 inherits the ID of cluster in a previous frame.

Thus, in step S38, the identical object determiner 19 calculates the agreement degree and generates an evaluation matrix to determine whether the clusters at different times are clusters of the identical object.

In step S40, the identical object determiner 19 determines whether the power supply of the vehicle 100 is turned off, and if not, returns to step S20 of FIG. 4A to continue the object recognition process. On the other hand, if the power supply of the vehicle 100 is turned off, the object recognition process according to the present embodiment is terminated.

Modified Example 1

In the above-described embodiment, as shown in Formula (1), the agreement degree F. is calculated based on the difference between the positions of the feature points corresponding to the clusters and the difference between the movement speeds, but the agreement degree may be further calculated using Intersection over Union (IoU).

IoU is an index indicating how much the two regions overlap, and is expressed by the following Formula (3):

$$IoU = \text{Area of Intersection/Area of Union} \quad (3).$$

In other words, when calculating the agreement degree F. of the clusters, a logical product of the area of the two processing regions set in the clusters at different time points is divided by a logical sum of the area of the two processing regions set in the clusters at different time points. The logical product of the area is the area on the image where the two clusters at different time points exist in common, and the logical sum of the area is the area on the image where at least one of the two clusters at different time points exists.

Therefore, using the IoU, the agreement degree F. may be calculated by the following Formula (4):

$$f = a \times (\text{difference in the positions of the feature points corresponding to the clusters})^2 + b \times (\text{difference in the movement speeds of the feature points corresponding to the clusters})^2 + c \times (1 - IoU) \quad (4)$$

where a, b, and c are coefficients.

In other words, in the formula for the agreement degree F., a third evaluation point is calculated using a value (IoU) obtained by dividing the logical product of the area of the two processing regions set in the clusters at different time points divided by a logical sum of the area of the two processing regions. Then the agreement degree F. is calculated by adding a value obtained by multiplying the third evaluation point by the third coefficient c.

Modified Example 2

In the above-described embodiment, an evaluation matrix is generated by calculating the agreement degree to determine whether the clusters at different time points are an identical object. However, a more simplified method of determination is possible.

Specifically, the clusters at different time points are determined to be clusters of the identical object when the difference between the positions of the two feature points corresponding to the clusters at different time points is less than or equal to a prescribed value and the difference between the movement speeds of the two feature points corresponding to the clusters at different time points is less than or equal to a prescribed value.

For example, the difference between the position of the feature point corresponding to the cluster C1' after moving the cluster C1 in a previous frame and the position of the feature point corresponding to the cluster C10 in the current frame is calculated and it is determined whether the difference is less than or equal to the threshold of the prescribed position. Similarly, the difference between the movement speed of the feature point corresponding to the cluster C1' and the movement speed of the feature point corresponding to the cluster C10 is calculated and it is determined whether the difference is less than or equal to the threshold of the prescribed speed. When the difference between the position and the movement speed is less than or equal to the prescribed threshold, it is determined that the clusters C1 and C10 at different time points are clusters of the identical object.

Effect of the First Embodiment

As described in detail above, in the object recognition device 1 according to the present embodiment, the distance measurement points acquired from the object detection sensor 3 are clustered to generate clusters at a fixed period, and a processing region is set by mapping the clusters on the images captured by the camera 5. Then, the movement speed of the feature points is calculated by extracting the feature points from the images in the set processing region, and it is determined whether the clusters at different time points are clusters of the identical object based on the difference between the positions of the two feature points corresponding to the clusters at different time points and the difference between the movement speeds. Thus, in the present embodiment, the movement speed of the feature points is used to determine whether the clusters are clusters of the identical object, so that the objects around the vehicle can be accurately recognized as the identical object at different time points.

Conventionally, when detecting an object, a Kalman filter is used to detect the movement speed of the cluster. However, it has been difficult to accurately measure the movement speed of the cluster since the points of measurement on the identical object may be clustered differently at different time points.

For example, as shown in FIG. 10, a front of the vehicle is clustered at time t=0, a lower half of the vehicle is clustered at time t=1, and a rear of the vehicle is clustered at time t=2. Since different parts of the same vehicle are clustered at different time points, the clusters change over time. Therefore, it is difficult to accurately measure the movement speeds of the clusters since they are not fixed.

In contrast, in this embodiment, the movement speed of the feature points corresponding to the clusters is used instead of the movement speed of the clusters. According to this embodiment, an object around the vehicle can be accurately recognized as the identical object at different time points using the accurate movement speed, since the movement speed of the feature points can be accurately calculated using optical flow.

Further, assuming, for example, a case in which an object comes out of the shadows, the shape of an entire object can be accurately recognized as the identical object before it can be measured by the object detection sensor 3, so that an object coming out of from the shadows can be recognized as the identical object at an early stage.

In the object recognition device 1 according to the present embodiment, the first evaluation point is calculated based on the difference in the positions of the two feature points corresponding to the clusters at different time points, and the second evaluation point is calculated based on the difference in the movement speeds of the two feature points corresponding to the clusters at different time points. The agreement degree is calculated based on the first evaluation point and the second evaluation point, and it is determined whether the clusters at different time points are clusters of the identical object based on the agreement degree. Thus, since the agreement degree is calculated using the difference between the positions of the feature points and the difference between the movement speeds of the feature points, it is possible to accurately determine whether the clusters at different time points are identical. Therefore, it is possible to accurately recognize the object around the vehicle as the identical object at different time points.

Furthermore, in the object recognition device 1 according to the present embodiment, the first evaluation point is the square of the difference between the positions of the two feature points corresponding to the clusters at different time points, and the second evaluation point is the square of the difference between the movement speeds of the two feature points corresponding to the clusters at different time points. Thus, since the agreement degree is calculated by using the square of the difference between the positions of the feature points and the difference between the movement speeds, it is possible to accurately determine whether the clusters at different time points are identical. Therefore, it is possible to accurately recognize an object around a vehicle as the identical object at different time points.

In the object recognition device 1 according to the present embodiment, a first coefficient to be multiplied by the first evaluation point and a second coefficient to be multiplied by the second evaluation point are set, and the agreement degree is calculated by adding the value obtained by multiplying the first evaluation point by the first coefficient and the value obtained by multiplying the second evaluation point by the second coefficient. Thus, even if the units of the first evaluation point and the second evaluation point are different, they can be adjusted to be normalized by multiplying the first coefficient and the second coefficient.

Furthermore, in the object recognition device 1 according to the present embodiment, the third evaluation point is calculated using the value obtained by dividing the logical product of the area of the two processing regions set in the clusters at different time points by the logical sum of the area of the two processing regions. The value obtained by multiplying the third evaluation point by the third coefficient is further added to calculate the agreement degree. Thus, the IoU can be used to calculate a more accurate agreement degree. Therefore, the objects around the vehicle can be more accurately recognized as the identical object at different time points.

Furthermore, in the object recognition device 1 according to the present embodiment, combinations among clusters at different time points are set and the agreement degree is calculated for each set combination to generate an evaluation matrix. Then, the agreement degree in which the two clusters at the combined different time points are sufficiently considered to be clusters of the identical object is set as a sufficient threshold, and the combination satisfying the sufficient threshold is extracted from the evaluation matrix and determined to be clusters of the identical object. Thus, since the evaluation matrix is used, the best cluster combination can be extracted regardless of the order in which it is determined whether the sufficient threshold is satisfied. In particular, in determining whether the sufficient threshold is satisfied for each combination in turn, it is possible that the non-best combination is extracted first and the best combination is not extracted. However, the best combination can be reliably extracted by using the evaluation matrix for determination.

Moreover, in the object recognition device 1 according to the present embodiment, when each of the difference between the positions of the two feature points corresponding to the clusters at different time points and the difference between the movement speeds are less than or equal to a prescribed value, it is determined that the clusters at different time points are clusters of the identical object. As a result, it is possible to determine whether the clusters are clusters of the identical object without calculating the agreement degree, thereby greatly reducing the processing load.

Second Embodiment

Hereinafter, a second embodiment to which the present invention is applied will be described with reference to the drawings. In the description of the drawings, the same reference numerals are given to the same parts, and a detailed description thereof is omitted.

Figure 11:
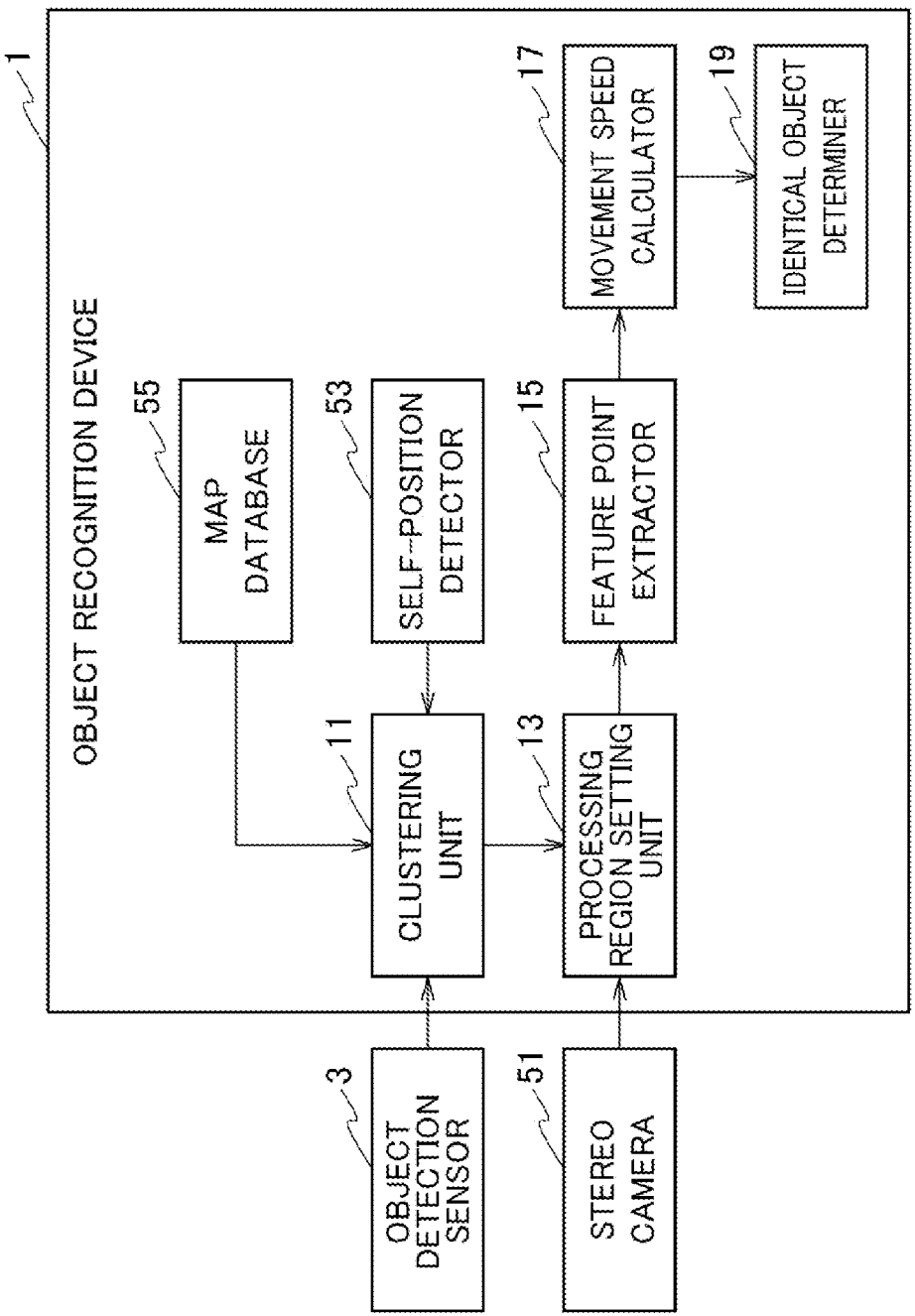
FIG. 11 is a block diagram showing a configuration of a vehicle including the object recognition device according to the second embodiment.

As shown in FIG. 11, the object recognition device 1 according to the present embodiment is different from the first embodiment in that a stereo camera 51 is provided instead of a camera 5, and a self-position detector 53 and a map database 55 are further provided.

The stereo camera 51 enables to capture a three-dimensional image. In the first embodiment, a two-dimensional position on the image and a movement speed were obtained, but in the present embodiment, a three-dimensional position and a movement speed including a depth direction can be obtained.

The self-position detector 53 may acquire the current position of the vehicle 100 from a GPS receiver mounted on the vehicle 100, or it may detect the self-position of the vehicle 100 by comparing objects around the vehicle detected by the object detection sensor 3 with map information stored in the map database 55. Alternatively, the moving direction and the moving distance of the vehicle from the reference position (for example, the position where the driving started) may be calculated based on a steering angle and a travel distance (odometry) of the vehicle, and a self-position of the vehicle 100 may be detected based on the reference position, the moving direction, and the moving distance.

The self-position detector 53 may be connected to a group of sensors (not shown) mounted on the vehicle 100 to acquire the behavior of the vehicle 100. For example, self-position detector 53 is connected to an accelerator sensor, a steering sensor, a brake sensor, a vehicle speed sensor, an acceleration sensor, a wheel speed sensor, and the like to acquire a sensor value output from these sensor groups.

The map database 55 is a database storing map information, and the stored map information is highly accurate map information including at least information such as the position of a road, the number of lanes, and the position of a sidewalk.

Figure 12:
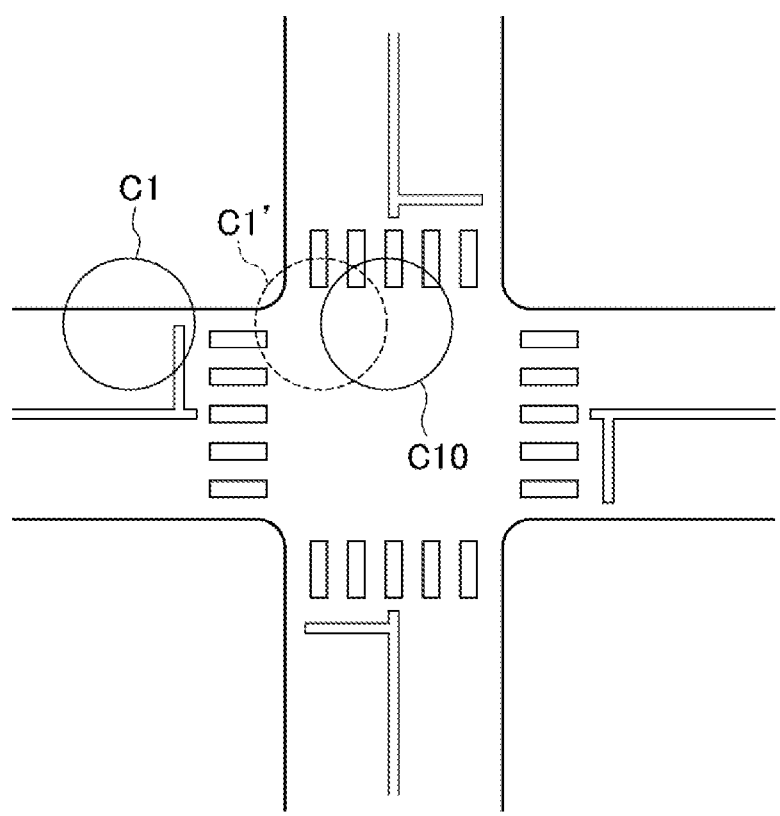
FIG. 12 is a diagram for explaining a method of determining the identical object by the object recognition device according to the second embodiment.

The clustering unit 11 converts a coordinate system of the cluster from a vehicle coordinate system to a map coordinate system using the self-position and map information detected by the self-position detector 53 when performing the clustering process to generate a cluster. As shown in FIG. 12, the map coordinate system is a coordinate system viewed from a bird's eye view of a map.

The processing region setting unit 13 maps the cluster generated by the clustering unit 11 on the three-dimensional image around the vehicle 100 captured by the stereo camera 51, and sets the region on the image mapped by the cluster as the processing region.

The feature point extractor 15 extracts a feature point from the three-dimensional image in the processing region set by the processing region setting unit 13. Since the feature point is extracted from the three-dimensional image, a three-dimensional position (coordinate) of the feature point is detected.

Since the three-dimensional coordinate of the feature point is detected, the movement speed calculator 17 calculates the three-dimensional optical flow. A three-dimensional movement speed of the feature point is calculated by averaging velocity vectors (vx, vy, vz) of the three-dimensional optical flows in the processing region. Further, the movement speed calculator 17 may also calculate the three-dimensional position and movement speed of the feature point by matching the left and right images of the stereo camera 51 in the previous and following frames.

Furthermore, since the vehicle 100 is moving, the movement speed calculator 17 calculates the absolute speed by subtracting the movement of the vehicle 100 from the calculated movement speed of the feature point. For example, the absolute speed of the feature point is calculated by subtracting the speed and yaw rate of the vehicle 100 from the movement speed of the feature point.

The identical object determiner 19 moves the cluster in the previous frame according to the calculated absolute speed, and obtains the cluster after the movement. For example, as shown in FIG. 12, a feature point in the cluster C1 at the time t=k is moved according to an absolute speed by a time difference between t=k and t=k+1 to obtain the cluster C1' after the movement.

Then, the identical object determiner 19 sets a combination between the cluster C1' after the movement shown in FIG. 12 and the cluster C10 of the current frame, and calculates the agreement degree for the combination.

The agreement degree F. can be expressed by a three-dimensional formula as shown in the following Formula (5):

$$f(Ci,Cj)=a(xi-xj)^2+a(yi-yj)^2+a(zi-zj)^2+b(vxi-vxj)^2+b(vyi-vyj)^2+b(vzi-vzj)^2 \quad (5).$$

When the agreement degree F. is thus calculated, the identical object determiner 19 determines whether the clusters at different time points are clusters of the identical object in the same method as in the first embodiment.

Modified Example

When performing the clustering process to generate a cluster, the clustering unit 11 may determine whether the generated cluster is a cluster corresponding to an object on a road or a cluster corresponding to an object on a sidewalk. After generating a cluster, the clustering unit 11 determines whether the cluster corresponds to an object on a sidewalk or an object on a road using the self-position detected by the self-position detector 53 and the position of the road and the position of the sidewalk included in map information.

When the cluster is determined to be a cluster corresponding to an object on a sidewalk, the cluster may be considered to correspond to a pedestrian, so the position becomes more important than the speed. Therefore, the identical object determiner 19 sets the coefficient a multiplied by the difference of the positions in the formula of the agreement degree F. with greater weight than the coefficient b. Specifically, the smaller the agreement degree F., the higher the possibility of determining that the objects are clusters of the identical object, so the coefficient a is set smaller than the coefficient b.

On the other hand, if a cluster is determined to be a cluster corresponding to an object on a road, the cluster is considered to correspond to a vehicle, so the speed becomes more important than the position. Therefore, the identical object determiner 19 sets the coefficient b multiplied by the difference of the movement speed in the expression of the agreement degree F. with greater weight than the coefficient a. Specifically, the smaller the agreement degree F., the higher the possibility of determining that the objects are clusters of the identical object, so the coefficient b is set smaller than the coefficient a.

Effect of the Second Embodiment

As described in detail above, in the object recognition device 1 according to the present embodiment, a three-dimensional position of the feature point is obtained using the stereo camera 51 to calculate the three-dimensional movement speed of the feature point. As a result, it is possible to determine whether the object is a cluster of the identical object using the three-dimensional position of the feature point and the movement speed, so that the object around the vehicle can be recognized as the identical object more accurately at different time points.

Further, the object recognition device 1 according to the present embodiment determines whether the cluster is a cluster corresponding to the object on the sidewalk or a cluster corresponding to the object on the road based on the detected self-position of the vehicle and at least map information storing the position of the road and the position of the sidewalk. The first coefficient a is set with greater weight than the second coefficient b if the cluster corresponds to an object on the sidewalk, and the second coefficient b is set with greater weight than the first coefficient a if the cluster corresponds to an object on the road. Thus, it may be considered that the cluster corresponds to the pedestrian if the cluster corresponds to the object on the sidewalk. As a result, the first coefficient a is emphasized and the agreement degree can be calculated by emphasizing the difference in position. On the other hand, it may be considered that the cluster corresponds to the vehicle if the cluster corresponds to the object on the road. As a result, the second coefficient b is emphasized and the agreement degree can be calculated by emphasizing the difference in movement speed. Therefore, the agreement degree can be accurately calculated according to the object to which the cluster corresponds.

The above-described embodiment is an example of the present invention. For this reason, the present invention is not limited to the above-described embodiment, and it is needless to say that various changes can be made depending on the design or the like, even in the case of an embodiment other than the present invention, as long as the technical concept of the present invention is not deviated.

REFERENCE SIGNS LIST

1 Object recognition device
3 Object detection sensor
5 Camera
11 Clustering unit
13 Processing region setting unit
15 Feature point extractor
17 Movement speed calculator
19 Identical object determiner
51 Stereo camera
53 Self position detector
55 Map database
100 Vehicle

The invention claimed is:

1. An object recognition method of recognizing an object existing around a vehicle comprising an object detection sensor and an imaging means, the object recognition method comprising:
   acquiring distance measurement points at which a distance to each point on the object existing around the vehicle is measured by the object detection sensor and generating a cluster at a fixed period by clustering the acquired distance measurement points;
   acquiring an image around the vehicle captured by the imaging means, mapping the cluster to the acquired image, and setting a region on the image to which the cluster is mapped as a processing region;
   extracting a feature point from the image in the processing region;
   calculating a movement speed of the extracted feature point; and
   determining whether clusters at different time points are clusters of an identical object, based on a difference between positions of two feature points corresponding to the clusters at the different time points and a difference between movement speeds of the two feature points corresponding to the clusters at the different time points.

2. The object recognition method according to claim 1, comprising:
   calculating a first evaluation point based on the difference between the positions of the two feature points corresponding to the clusters at the different time points;
   calculating a second evaluation point based on the difference between the movement speeds of the two feature points corresponding to the clusters at the different time points;
   calculating an agreement degree indicating a degree of agreement of the clusters at the different time points based on the first evaluation point and the second evaluation point; and
   determining whether the clusters at the different time points are the clusters of the identical object based on the agreement degree.

3. The object recognition method according to claim 2, wherein the first evaluation point is a square of the difference between the positions of the two feature points corresponding to the clusters at the different time points, and the second evaluation point is a square of the difference between the movement speeds of the two feature points corresponding to the clusters at the different time points.

4. The object recognition method according to claim 3, comprising:
   setting a first coefficient to be multiplied by the first evaluation point and a second coefficient to be multiplied by the second evaluation point; and
   calculating the agreement degree by adding a value obtained by multiplying the first evaluation point by the first coefficient and a value obtained by multiplying the second evaluation point by the second coefficient.

5. The object recognition method according to claim 4, comprising:
   calculating a third evaluation point using a value obtained by dividing a logical product of areas of two processing regions set for the clusters at the different time points by a logical sum of the areas of the two processing regions; and
   calculating the agreement degree by further adding a value obtained by multiplying the third evaluation point by a third coefficient.

6. The object recognition method according to claim 2, comprising:
   setting combinations among the clusters at the different time points and generating an evaluation matrix by calculating the agreement degree for each set combination;
   setting an agreement degree in which combined two clusters at the different time points are sufficiently considered to be clusters of the identical object as a sufficient threshold; and
   extracting a combination satisfying the sufficient threshold from the evaluation matrix and determining the extracted combination as the clusters of the identical object.

7. The object recognition method according to claim 1, comprising:
   determining that the clusters at the different time points are the clusters of the identical object upon the difference between the positions of the two feature points corresponding to the clusters at the different time points being less than or equal to a prescribed value and the difference between the movement speeds of the two feature points corresponding to the clusters at the different time points being less than or equal to a prescribed value.

8. The object recognition method according to claim 1, wherein the imaging means is a stereo camera, and
   wherein the object recognition method comprises obtaining a three-dimensional position of the feature point and calculating a three-dimensional movement speed of the feature point.

9. The object recognition method according to claim 4, comprising:
   detecting a self-position of the vehicle;
   determining whether the cluster is a cluster corresponding to an object on a sidewalk or a cluster corresponding to an object on a road, based on the detected self-position and map information storing at least a position of the road and a position of the sidewalk;
   upon the cluster being the cluster corresponding to the object on the sidewalk, setting the first coefficient with greater weight than the second coefficient; and upon the cluster being a cluster corresponding to the object on the road, setting the second coefficient with greater weight than the first coefficient.

10. An object recognition device comprising:
a controller configured to recognize an object existing around a vehicle including an object detection sensor and an imaging means, wherein the controller is configured to:
  acquire distance measurement points at which a distance to each point on an object existing around the vehicle is measured by the object detection sensor and generate a cluster at a fixed period by clustering the acquired distance measurement points;
  acquire an image around the vehicle captured by the imaging means, map the cluster to the acquired image, set a region on the image to which the cluster is mapped as a processing region;
  extract a feature point from the image in the set processing region;
  calculate a movement speed of the extracted feature point; and
  determine whether clusters at different time points are clusters of an identical object, based on a difference between positions of two feature points corresponding to the clusters at the different time points and a difference between movement speeds of the two feature points corresponding to the clusters at the different time points.

* * * * *